Dec. 25, 1962 B. SOLOW ET AL 3,070,647

ENCAPSULATED ELECTRICAL COMPONENT

Filed June 29, 1959

INVENTORS
BENJAMIN SOLOW
JOHN J. BOHRER

BY Donald S. Cohen

ATTORNEY

United States Patent Office 3,070,647 Patented Dec. 25, 1962

3,070,647

ENCAPSULATED ELECTRICAL COMPONENT

Benjamin Solow, North Hollywood, Calif., and John J. Bohrer, Narberth, Pa., assignors to International Resistance Company, Philadelphia, Pa.

Filed June 29, 1959, Ser. No. 823,779
2 Claims. (Cl. 174—52)

The present invention relates to an encapsulated electrical component, and more particularly to a terminal seal for an encapsulated electrical component.

For many types of electrical components, such as resistors, capacitors, and rectifiers, it is desirable to encapsulate the electrical component to protect the component from dirt and moisture which may adversely affect the electrical properties of the component. One method of encapsulating an electrical component is to mold or cast a jacket of an electrical insulating plastic around the component with the terminals of the component extending through the plastic jacket. A problem with such encapsulated components is to obtain a good seal between the terminals and the plastic jacket. Since the terminals of the component must be of an electrical conducting metal, and are often coated with a solderable layer, it is difficult to provide the component with a protective jacket which has the same coefficient of expansion as the terminals. Thus, when the temperature of the electric component varies, the plastic jacket often pulls away from the terminals, and thereby provides a passage between the terminals and the jacket through which moisture can pass to the component. Therefore, it is desirable to provide the terminals of the component with a sealing member which will prevent moisture from passing to the component along the terminals.

It is an object of the present invention to provide a novel encapsulated electrical component.

It is another object of the present invention to provide a terminal seal for an encapsulated electrical component.

It is a further object of the present invention to provide a terminal seal for an electrical component which is encapsulated in a plastic jacket.

Other objects will appear hereinafter.

For the purpose of illustrating the invention there is shown in the drawings forms which are presently preferred; it being understood, however, that this invention is not limited to the precise arrangements and instrumentalities shown.

Figure 1:
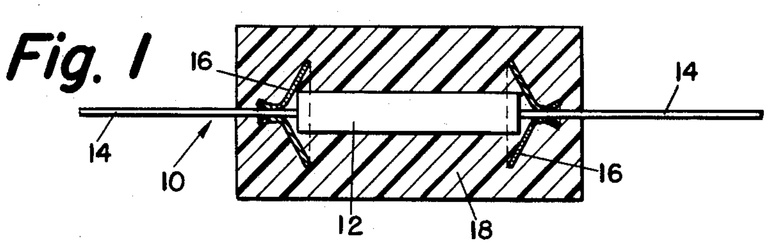
FIGURE 1 is sectional view through one embodiment of the encapsulated electrical component of the present invention.

Referring initially to FIGURE 1, the encapsulated electrical component of the present invention is generally designated as 10.

The encapsulated electrical component 10 comprises an electrical component 12, such as a resistor, capacitor, or rectifier. A separate terminal wire 14 of an electrical conducting metal extends longitudinally from each end of the component 12. A separate metal sealing member 16 extends around and is secured to each of the terminal wires 14 adjacent the end of the component 12. A protective jacket or casing 18 surrounds the component 12, the sealing members 16, and the portions of the terminal wires 14 adjacent the component 12. Jacket 18 is of an electrical insulating plastic which is molded or cast around the component 12, sealing member 16, and terminal wires 14.

Figure 2:
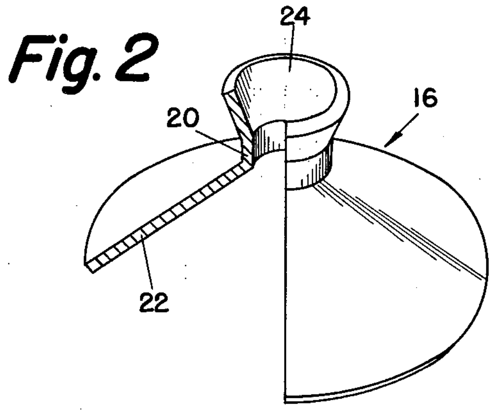
FIGURE 2 is perspective view, partly broken away, of the terminal seal for the encapsulated electrical component shown in FIGURE 1.

Referring to FIGURE 2, each of the metal sealing members 16 comprises a cylindrical hub 20, and an annular, cup-shaped flange 22 extending radially from one end of the hub 20. The other end 24 of the hub 20 is flared radially outwardly slightly. The sealing members 16 are made of a metal to which the particular plastic of the jacket 18 will adhere well. The sealing members 16 are sufficiently thin so as to be flexible. The sealing members 16 are secured to the terminal wires 14 by inserting the terminal wires 14 through the hub 20 of the sealing member 16. The sealing members 16 are soldered to the terminal members 14 to provide a tight seal between the sealing members 16 and the terminal wires 14. Thus, any moisture passing along the terminal wires 14 cannot pass between the hubs 20 of the sealing members 16 and the terminal wires 14. Since the plastic of the jacket 18 adheres well to the sealing member 16, a seal is provided between the sealing members 16 and the jacket 18. Since the sealing members 16 are flexible, upon expansion or contraction of the jacket 18, the flanges 22 of the sealing members 16 will flex with the movement of the jacket 18 so as to maintain the seal between the sealing members 16 and the jacket 18 in spite of any differences in coefficient of thermal expansion between the sealing members 16 and the jacket 18. In addition, the flared portion 24 and the flange 22 of the sealing members 16 provide a labyrinth seal to prevent any moisture from passing along the terminal wires 14 to the component 12.

Figure 5:
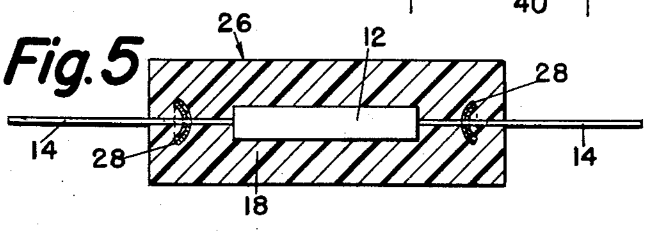
FIGURE 5 is a sectional view of the second embodiment of the encapsulated electrical component of the present invention.

Referring to FIGURE 5, another embodiment of the encapsulated electrical component of the present invention is generally designated as 26.

Encapsulated electrical component 26 comprises an electrical component 12 having a separate terminal wire 14 extending longitudinally from each end thereof. A separate sealing member 28 surrounds and is secured to each of the terminal wires 14 adjacent the ends of the component 12. A protective jacket or casing 18 of an electrical insulating plastic surrounds the component 12, sealing members 28, and the portion of the terminal wires 14 adjacent the component 12.

Figure 3:
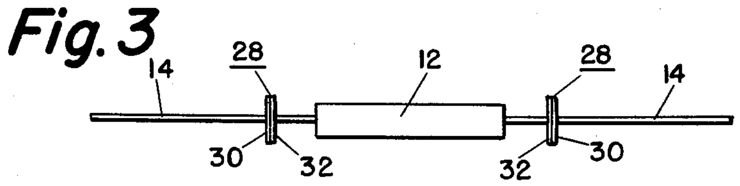
FIGURE 3 is a side elevational view of another embodiment of the electrical component of the present invention prior to being encapsulated.
Figure 4:
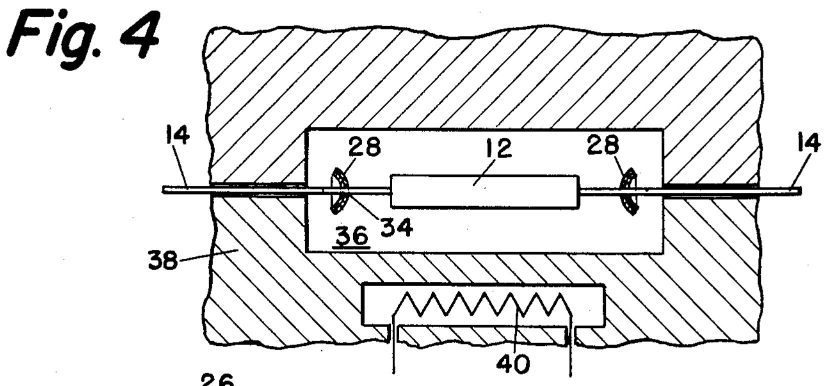
FIGURE 4 is a sectional view through a mold illustrating the manner of applying the protective jacket to the electrical component shown in FIGURE 3.

As shown in FIGURE 3, each of the sealing members 28 initially comprises a small, flat, bi-metallic disc. The layers 30 and 32 of the sealing member 28 are made of two different metals having different coefficients of expansion, such as iron and brass. Thus, when the sealing member 28 is heated, the layer 32 will expand more than the layer 30 so that the sealing member 28 will take the cup-shaped form shown in FIGURE 4. Each of the sealing members 28 has a central hole 34 therethrough. The sealing members 28 are secured to the terminal wires 14 by inserting the terminal wires 14 through the holes 34 in the sealing members 28, and soldering the sealing members 28 to the terminal wires 14 to provide a tight seal between the sealing members 28 and the terminal wires 14.

To form the encapsulated electrical component 26, the assembly of the electrical component 12 having the sealing members 28 secured to the terminal wires 14 is placed in the cavity 36 of a mold 38. The mold 38 is heated by a heater 40. This heats the sealing members 28 and causes the sealing members 28 to take the cup-shaped form shown in FIGURE 4. The mold cavity 36 is then filled with the plastic of the jacket 18, and the jacket 18 is cured. The encapsulated electrical component 26 is then removed from the mold 38 and allowed to cool. Upon cooling the encapsulated electrical component 26, the sealing members 28 will tend to move back to their initial flat condition. However, since the jacket 18 which surrounds the sealing members 28 is hard, the sealing members 28 are prevented from returning to their initial flat condition. Thus, the sealing members 28 are placed under high stress, and the convex surface of each of the sealing members 28 will tightly engage the jacket 18 to provide a tight seal between the sealing members 28 and the jacket 18. In addition, the cup-shaped sealing members 28 provide a labyrinth seal to prevent moisture from passing along the terminal wires 14 to the component 12.

The present invention may be embodied in other specific forms without departing from the spirit or essential attributes thereof and, accordingly, reference should be made to the appended claims, rather than to the foregoing specification as indicating the scope of the invention.

We claim:

1. An encapsulated electrical component comprising an electrical component, terminal members extending from said component, a separate cup-shaped sealing member surrounding and secured to each of said terminal members, each of said sealing members being a bi-metallic disc of two metals having different coefficients of expansion with each of said discs having a central hole therethrough through which the terminal member extends, and a jacket of an electrically insulating plastic surrounding said component, said sealing members, and a portion of each of said terminal members with the terminal members projecting beyond said jacket.

2. An encapsulated electrical component in accordance with claim 1 in which each of said sealing members is initially flat, and is cup-shaped upon being heated so that the sealing members in their cup-shaped form are stressed and tightly engage the plastic jacket.

References Cited in the file of this patent

FOREIGN PATENTS

| | | |
|---|---|---|
| 121,684 | Australia | July 1, 1946 |
| 611,719 | Great Britain | Nov. 3, 1948 |
| 522,607 | Belgium | Sept. 30, 1953 |
| 809,271 | Great Britain | Feb. 18, 1959 |